(12) United States Patent
Kim

(10) Patent No.: US 11,455,889 B2
(45) Date of Patent: Sep. 27, 2022

(54) APPARATUS AND METHOD FOR CONTROLLING REMOTE PARKING IN VEHICLE

(71) Applicants: Hyundai Motor Company, Seoul (KR); Kia Motors Corporation, Seoul (KR)

(72) Inventor: Yun Sik Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 274 days.

(21) Appl. No.: 16/451,763

(22) Filed: Jun. 25, 2019

(65) Prior Publication Data
US 2020/0273343 A1    Aug. 27, 2020

(30) Foreign Application Priority Data
Feb. 25, 2019   (KR) ........................ 10-2019-0021942

(51) Int. Cl.
| | |
|---|---|
| *G08G 1/16* | (2006.01) |
| *G05D 1/02* | (2020.01) |
| *G05D 1/00* | (2006.01) |
| *G06V 20/58* | (2022.01) |

(52) U.S. Cl.
CPC .......... *G08G 1/168* (2013.01); *G05D 1/0022* (2013.01); *G05D 1/0255* (2013.01); *G06V 20/586* (2022.01); *G05D 2201/0213* (2013.01)

(58) Field of Classification Search
CPC .... G08G 1/168; G05D 1/0022; G05D 1/0255; G05D 2201/0213; G06K 9/00812
See application file for complete search history.

(56) References Cited

U.S. PATENT DOCUMENTS

| | | | | |
|---|---|---|---|---|
| 2009/0123028 | A1* | 5/2009 | Satonaka | G01S 13/931 382/103 |
| 2011/0068953 | A1* | 3/2011 | Toledo | B62D 15/0285 340/932.2 |
| 2015/0254981 | A1* | 9/2015 | Tachibana | G06K 9/00812 340/932.2 |
| 2016/0284217 | A1* | 9/2016 | Lee | B60D 1/30 |
| 2017/0129537 | A1* | 5/2017 | Kim | G05D 1/0011 |
| 2017/0228605 | A1* | 8/2017 | Konishi | G06K 9/00798 |
| 2018/0029591 | A1* | 2/2018 | Lavoie | G06N 7/005 |
| 2018/0039264 | A1* | 2/2018 | Messner | G05D 1/0238 |
| 2018/0086381 | A1* | 3/2018 | Hoffman, Jr. | B62D 15/0285 |
| 2018/0164817 | A1* | 6/2018 | Herz | G05D 1/0212 |
| 2018/0186365 | A1* | 7/2018 | Kim | B60W 30/06 |
| 2019/0283736 | A1* | 9/2019 | Watanabe | B60W 30/06 |
| 2020/0148199 | A1* | 5/2020 | Hasejima | G05D 1/0212 |

FOREIGN PATENT DOCUMENTS

KR         101892026 B1    8/2018

* cited by examiner

*Primary Examiner* — Jason Holloway
(74) *Attorney, Agent, or Firm* — Fox Rothschild LLP

(57) ABSTRACT

An apparatus for controlling remote parking in a vehicle is provided. The apparatus includes an ultrasonic sensor that measures a distance from the vehicle to an obstruction and a receiver that receives a surround view monitoring (SVM) image. A controller executes remote parking of the vehicle by selectively using the distance from the obstruction, the distance being measured by the ultrasonic sensor, and the SVM image received by the receiver.

22 Claims, 11 Drawing Sheets

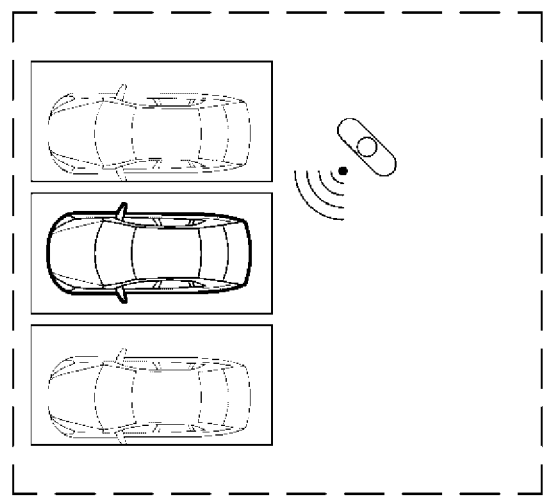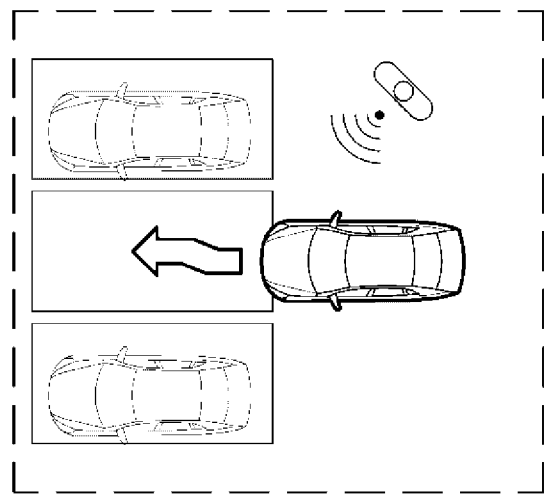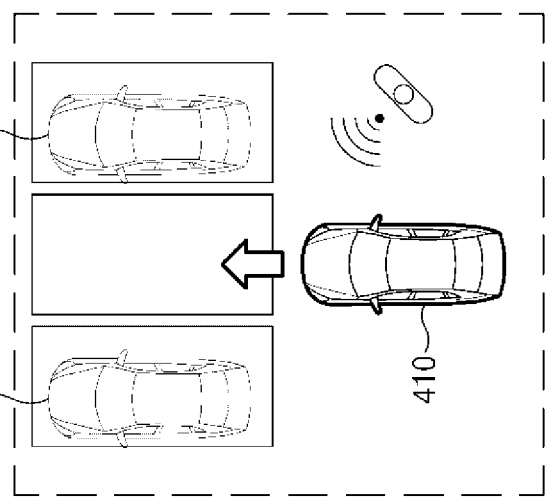
FIG.5

APPARATUS AND METHOD FOR CONTROLLING REMOTE PARKING IN VEHICLE

CROSS-REFERENCE TO RELATED APPLICATION

This application claims the benefit of priority to Korean Patent Application No. 10-2019-0021942, filed on Feb. 25, 2019, the entire contents of which are incorporated herein by reference.

TECHNICAL FIELD

The present disclosure relates to an apparatus and method for controlling remote parking in a vehicle, and more particularly to an apparatus and method that control remote parking of a vehicle in a narrow parking space using an ultrasonic sensor and a surrounding view monitoring image.

BACKGROUND

A remote smart parking assist (RSPA) system remotely receives a parking signal by a remote controller operation signal of a driver, identifies a parking space in which a vehicle is able to park, using an ultrasonic sensor and an obstruction determination device, and automatically parks the vehicle in the parking space to facilitate remote driving and parking without driver interference or control and enhance convenience of the driver.

Since the ultrasonic sensor is unable to detect an obstruction located closer than a minimum sensing distance, when a separation distance from other vehicles which are parked at both sides of a parking space is less than the minimum sensing distance due to the parking space being narrow, the ultrasonic sensor is unable to detect the other vehicles as obstructions. Thus, since the parking space is narrow, when a separation distance from other vehicles parked at both sides of the parking space is less than the minimum sensing distance of the ultrasonic sensor, a conventional RSPA system is unable to park the vehicle.

Furthermore, the conventional RSPA system may measure the separation distance from the other vehicles parked at both the sides of the parking space using the ultrasonic sensor and may park the vehicle based on the measured separation distance. Thus, the conventional RSPA system may still park the vehicle in the center between the other vehicles but may fail to park the vehicle in the center of a parking slot thus providing a less accurate parking system.

SUMMARY

The present disclosure provides an apparatus and method for controlling remote parking in a vehicle to park the vehicle in a narrow parking space based on an ultrasonic sensor and a surrounding view monitoring (SVM) image and to provide various parking modes. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus may include: an ultrasonic sensor configured to measure a distance from an obstruction, a receiver configured to receive a surround view monitoring (SVM) image, and a controller configured to execute remote parking of the vehicle by selectively using the distance from the obstruction, the distance being measured by the ultrasonic sensor, and the SVM image received by the receiver.

The apparatus may further include a communicator configured to transmit the distance from the obstruction and the SVM image to a user terminal. The controller may be configured to execute the remote parking of the vehicle based on a parking mode transmitted from the user terminal. The parking mode may include a space center mode, a line center mode, a right line mode, and a left line mode. The controller may be configured to execute the remote parking of the vehicle based on the distance from the obstruction, the distance being measured by the ultrasonic sensor, when a width of a parking space is greater than a threshold in the space center mode.

Additionally, the controller may be configured to execute the remote parking of the vehicle based on the SVM image, when a width of a parking space is less than or equal to a threshold in the space center mode. The controller may also be configured to execute the remote parking of the vehicle based on a distance from the vehicle to the obstruction, the distance being measured using the SVM image, when the distance to the obstruction, the distance being measured by the ultrasonic sensor, is less than a minimum sensing distance in the space center mode. The remote parking of the vehicle may be executed based on a distance from the obstruction, the distance being measured using the SVM image in the line center mode.

Further, the controller may be configured to execute the remote parking of the vehicle based on a distance from a right line of a parking slot, the distance being measured using the SVM image in the right line mode. The controller may be configured to execute the remote parking of the vehicle based on a distance from a left line of a parking slot, the distance being measured using the SVM image in the left line mode.

According to another aspect of the present disclosure, a method may include: measuring, by an ultrasonic sensor of the vehicle, a distance from an obstruction, receiving, by a receiver of the vehicle, a surround view monitoring (SVM) image, and executing, by a controller of the vehicle, remote parking of the vehicle by selectively using the measured distance from the obstruction and the received SVM image.

The method may further include transmitting, by a communicator of the vehicle, the distance from the obstruction and the SVM image to a user terminal. The executing of the remote parking of the vehicle may include executing the remote parking of the vehicle based on a parking mode transmitted from the user terminal. The parking mode may include a space center mode, a line center mode, a right line mode, and a left line mode.

Additionally, the executing of the remote parking of the vehicle may include executing the remote parking of the vehicle based on the distance from the obstruction, the distance being measured by the ultrasonic sensor, when a width of a parking space is greater than a threshold in the space center mode. The executing of the remote parking of the vehicle may further include executing the remote parking of the vehicle based on the SVM image, when a width of a parking space is less than or equal to a threshold in the space center mode.

The executing of the remote parking of the vehicle may include executing the remote parking of the vehicle based on a distance from the obstruction, the distance being measured using the SVM image, when the distance from the obstruction, the distance being measured by the ultrasonic sensor, is less than a minimum sensing distance in the space center mode. Further, the executing of the remote parking of the vehicle may include executing the remote parking of the vehicle based on a distance from the obstruction, the distance being measured using the SVM image in the line center mode.

The remote parking of the vehicle may further include executing the remote parking of the vehicle based on a distance from a right line of a parking slot, the distance being measured using the SVM image in the right line mode. The executing of the remote parking of the vehicle may include executing the remote parking of the vehicle based on a distance from a left line of a parking slot, the distance being measured using the SVM image in the left line mode.

BRIEF DESCRIPTION OF THE DRAWINGS

The above and other objects, features and advantages of the present disclosure will be more apparent from the following detailed description taken in conjunction with the accompanying drawings:

FIG. 5 is a drawing illustrating a line center mode provided by an apparatus for controlling remote parking in a vehicle according to an exemplary embodiment of the present disclosure;

DETAILED DESCRIPTION

Figure 1:
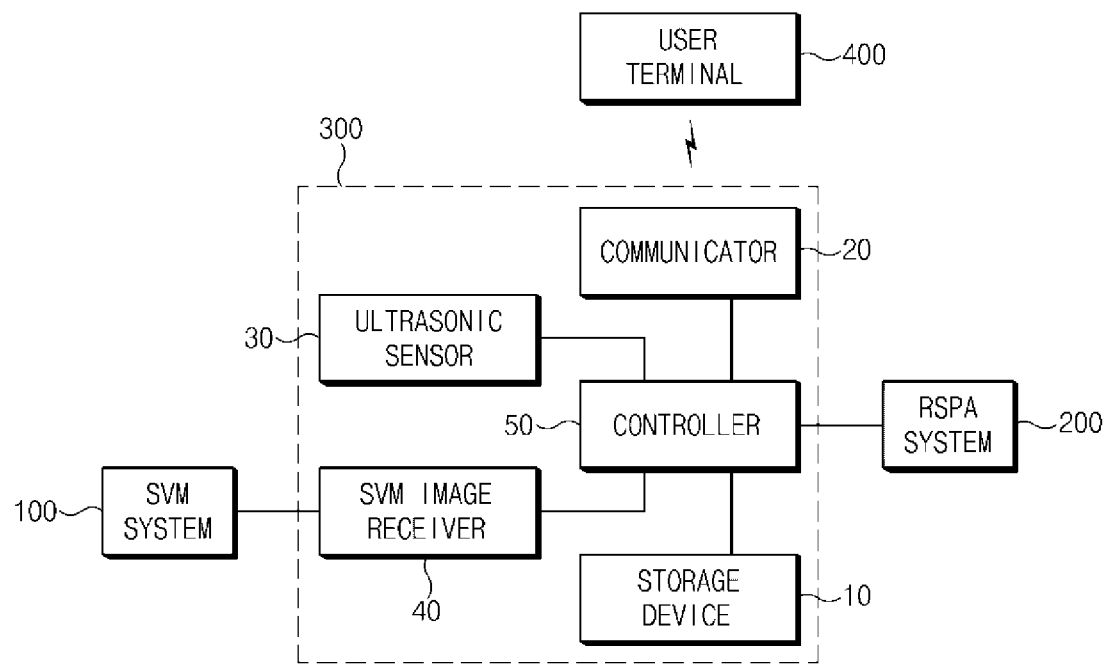
FIG. 1 is a block diagram illustrating a configuration of an apparatus for controlling remote parking in a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for controlling remote parking in a vehicle according to an exemplary embodiment of the present disclosure. As shown in FIG. 1, an apparatus 300 for controlling remote parking in a vehicle according to an exemplary embodiment of the present disclosure may include a storage device 10, a communicator 20, an ultrasonic sensor 30, a surround view monitoring (SVM) image receiver 40, and a controller 50. In particular, the respective components may be combined with each other to form one component depending on a manner which executes the apparatus 300 for controlling the remote parking in the vehicle according to an exemplary embodiment of the present disclosure, and some components may be omitted according to a manner which executes an exemplary embodiment of the present disclosure.

The storage device 10 may be configured to store various logics, algorithms, and programs required to park the vehicle in a narrow parking space based on the ultrasonic sensor 30 and an SVM image and provide various parking modes. Furthermore, the storage device 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The communicator 20 may be a module configured to provide a communication interface with a user terminal 400, and may be configured to receive various commands from the user terminal 400 and transmit data (e.g., an SVM image or a distance from an obstruction measured by the ultrasonic sensor 30) to the user terminal 400. Herein, the user terminal 400 may include a smartphone, a laptop computer, a digital broadcast terminal, personal digital assistants (PDA), a portable multimedia player (PMP), a slate personal computer (PC), a tablet PC, an ultrabook, or a wearable device.

For example, the communicator 20 may be configured to receive a parking request signal, an exit request signal, or various parking modes from the user terminal 400 and transmit a real-time SVM image and a distance from an obstruction, measured by the ultrasonic sensor 30, to the user terminal 400 during parking. The transmitted SVM image and the transmitted distance from the obstruction, measured by the ultrasonic sensor 30, may be displayed on a screen of the user terminal 400.

Herein, the parking mode may include a mode (hereinafter referred to as "space center mode") for parking the vehicle in the center of a parking space, a mode (hereinafter referred to as "line center mode") for parking the vehicle in the center of a parking slot, a mode (hereinafter referred to as "right line mode") for parking the vehicle proximate to a right line, or a mode (hereinafter referred to as "left line mode") for parking the vehicle proximate to a left line. In particular, the parking space may refer to a space between two vehicles, and the parking slot may refer to a section configured with parking lines.

The communicator 20 may include at least one or more of a mobile communication module, a wireless Internet module, and a short-range communication module. Herein, the mobile communication module may be configured to transmit and receive a wireless signal with an autonomous vehicle, a service server, or the like over a mobile communication network which is established according to a technical standard or a communication mode for mobile communication (e.g., global system for mobile communication (GSM), code division multiple access (CDMA), code division multiple access 200 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), LTE-advanced (LTE-A), or the like).

The wireless Internet module may be a module for accessing a wireless Internet and may be configured to transmit and receive a wireless signal with the autonomous vehicle, the service server, or the like over wireless local area network (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), LTE-advanced (LTE-A), or the like. The short-range communication module may support the short-range communication using at least one of Bluetooth™, radio frequency identification (RFID), infrared data association (IrDA), ultra wideband (UWB), ZigBee, near field communication (NFC), and wireless universal serial bus (USB) technologies.

Figure 2:
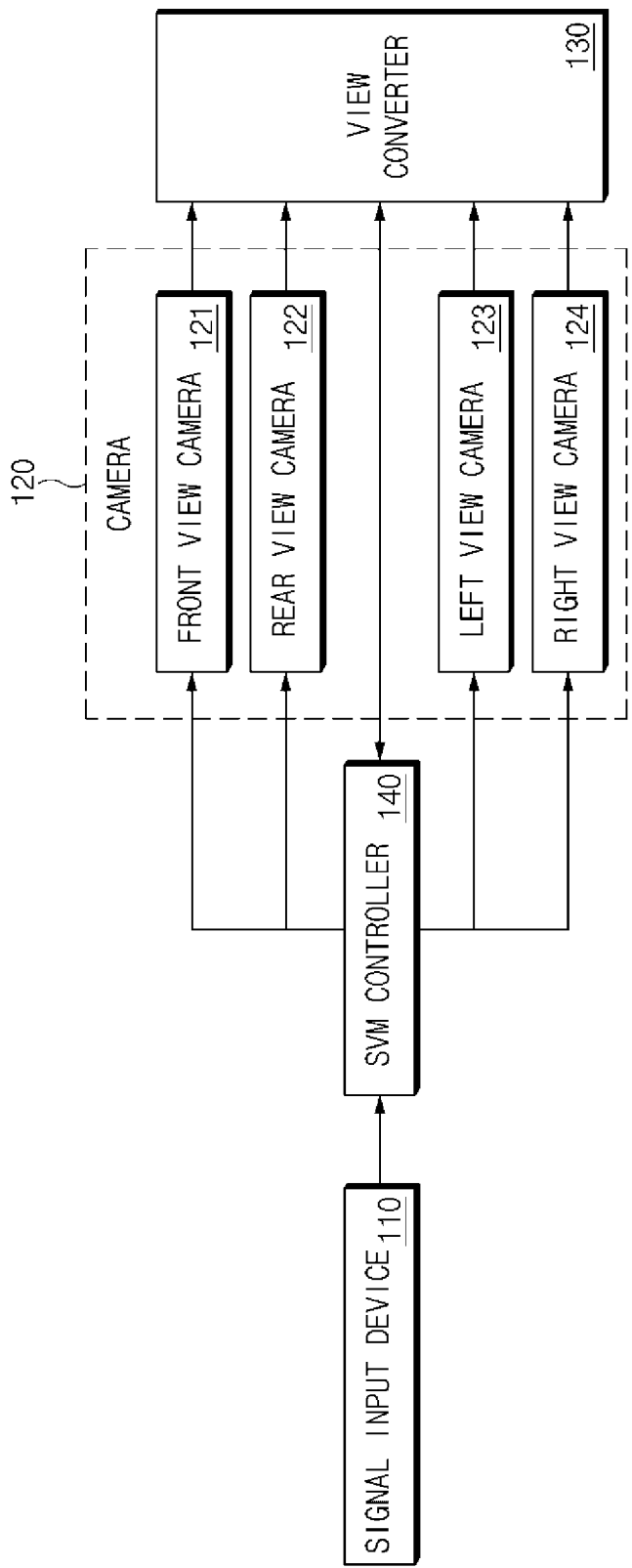
FIG. 2 is a block diagram illustrating a configuration of an SVM system used in an exemplary embodiment of the present disclosure.
Figure 3:
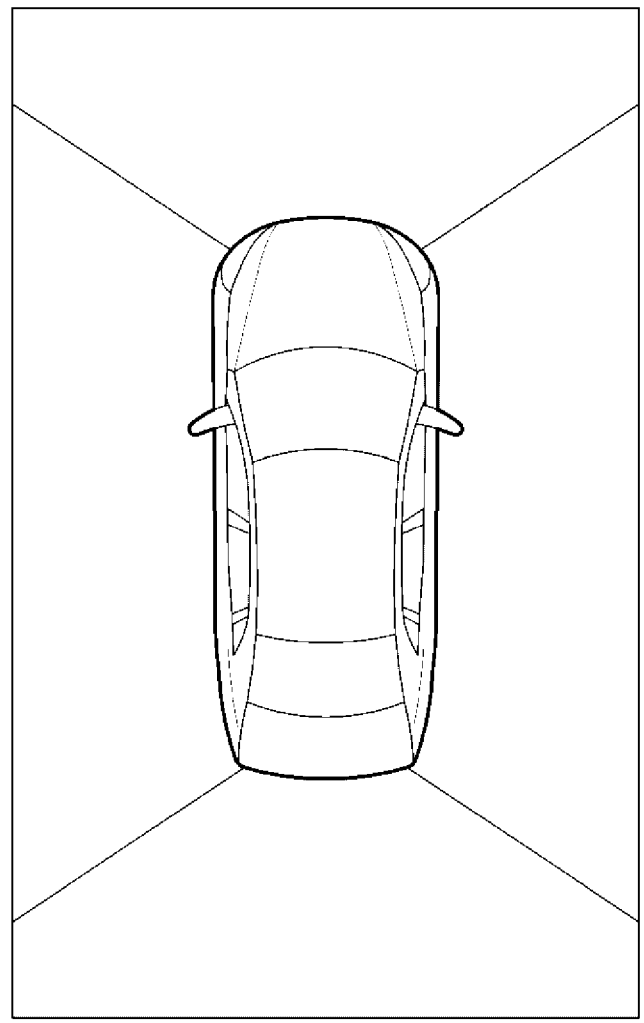
FIG. 3 is a drawing illustrating an example of an SVM image used in an exemplary embodiment of the present disclosure.

Further, the ultrasonic sensor 30 may be configured to measure a distance from an obstruction using ultrasonic waves. The SVM image receiver 40 may be configured to receive an SVM image from an SVM system 100. Hereinafter, a description will be given in detail of a configuration of the SVM system 100 with reference to FIG. 2. FIG. 2 is a block diagram illustrating a configuration of an SVM system used in an exemplary embodiment of the present disclosure. FIG. 3 is a drawing illustrating an example of an SVM image used in an exemplary embodiment of the present disclosure.

As shown in FIG. 2, an SVM system 100 used in an exemplary embodiment of the present disclosure may include a signal input device 110, a camera 120, a view converter 130, and an SVM controller 140. The signal input device 110 may be configured to receive an activation signal from a driver. The signal input device 110 may be implemented as an SVM button, but is not limited thereto and may be implemented as another input device. The SVM button may be configured to receive a signal for instructing to operate in an SVM mode. When the SVM button is pushed or otherwise engaged by the driver, the SVM button may be configured to generate an activation signal for the SVM mode.

The camera 120 may be an imaging device configured to capture an image around a vehicle and may include a front view camera 121, a rear view camera 122, a left view camera 123, and a right view camera 124. The cameras 121 to 124 may be components included in the SVM system 100 and may be tuned to capture an optimum SVM image. The front view camera 121 may be disposed in a front surface of the vehicle and may be used to obtain an image in front of the vehicle. Particularly, the front view camera 121 may be disposed in, but not limited to, a central portion between both headlamps of the vehicle. The rear view camera 122 may be disposed in a rear surface of the vehicle and may be used to obtain an image behind the vehicle. Particularly, the rear view camera 122 may be disposed in, but not limited to, a central portion between both rear lamps of the vehicle.

The left view camera 123 may be disposed in a left surface of the vehicle and may be used to obtain an image at a left side of the vehicle. Particularly, the left view camera 123 may be disposed in, but not limited to, a lower portion of a left side mirror of the vehicle. The right view camera 123 may be disposed in a right surface of the vehicle and may be used to obtain an image at a right side of the vehicle. Particularly, the right view camera 124 may be disposed in, but not limited to, a lower portion of a right side mirror of the vehicle.

A view converter 130 may be configured to generate an SVM image using the images captured by the cameras 121 to 124. The generated SVM image may refer to a top view image as shown in FIG. 3. The SVM controller 140 may be configured to operate the signal input device 110, the camera 120, and the view converter 130 in the process of generating the SVM image. A controller 50 of FIG. 1 may be configured to perform overall control such that the respective components perform their respective functions. The controller 50 may be implemented in the form of hardware or software or in the form of a combination thereof and may be specifically programmed to execute the processes described herein.

Particularly, the controller 50 may be implemented as, but not limited to, a microprocessor. An exemplary embodiment of the present disclosure is exemplified as the controller 50 is implemented independently of the RSPA system 200. However, exemplary embodiments are not limited thereto. For example, the RSPA 200 may be implemented in the form of performing all functions of the controller 50. Furthermore, the controller 50 may be configured perform a variety of control required in the process of parking the vehicle in a narrow parking space based on an ultrasonic sensor 30 of FIG. 1 and an SVM image and providing various parking modes.

Furthermore, the controller 50 may be configured to operate the RSPA system 200 to park the vehicle based on a parking mode received from a user terminal 400 of FIG. 1. In particular, the controller 50 may be configured to operate the RSPA system 200 to perform a parking process of the vehicle only while a signal corresponding to the parking mode is continuously received from the user terminal 400. Furthermore, the controller 50 may be configured to generate virtual parking lines when the parking lines are not recognized or no parking lines are detected or present. In particular, the controller 50 may be configured to generate the virtual parking lines when an interval (a parking space) between vehicles which park exceeds a threshold value. In other words, the controller 50 may not generate the virtual parking lines when the interval between vehicles is narrow. Furthermore, the controller 50 may be configured to park the vehicle based on the virtual parking lines.

Figure 4A:
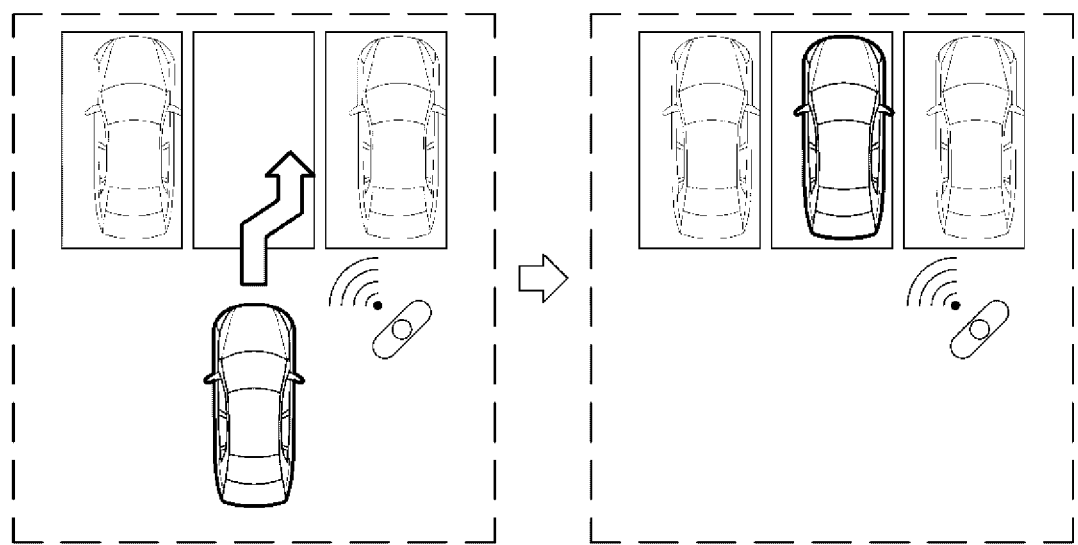
FIG. 4A is a drawing illustrating a first example for a space center mode provided by an apparatus for controlling remote parking in a vehicle according to an exemplary embodiment of the present disclosure.

Hereinafter, a description will be given in detail of an operation of the controller 50 with reference to FIGS. 4A to 6. FIG. 4A is a drawing illustrating a first example for a space center mode provided by an apparatus for controlling remote parking in a vehicle according to an exemplary embodiment of the present disclosure. FIG. 4A illustrates a case where an interval (e.g., a parking space) between vehicles which park at left and right sides within a parking slot is sufficiently wide. As shown in FIG. 4A, since the vehicle is capable of being parked using only an ultrasonic sensor 30 of FIG. 1, a controller 50 of FIG. 1 may be configured to operate an RSPA system 200 of FIG. 1 based on data measured by the ultrasonic sensor 30.

Figure 4B:
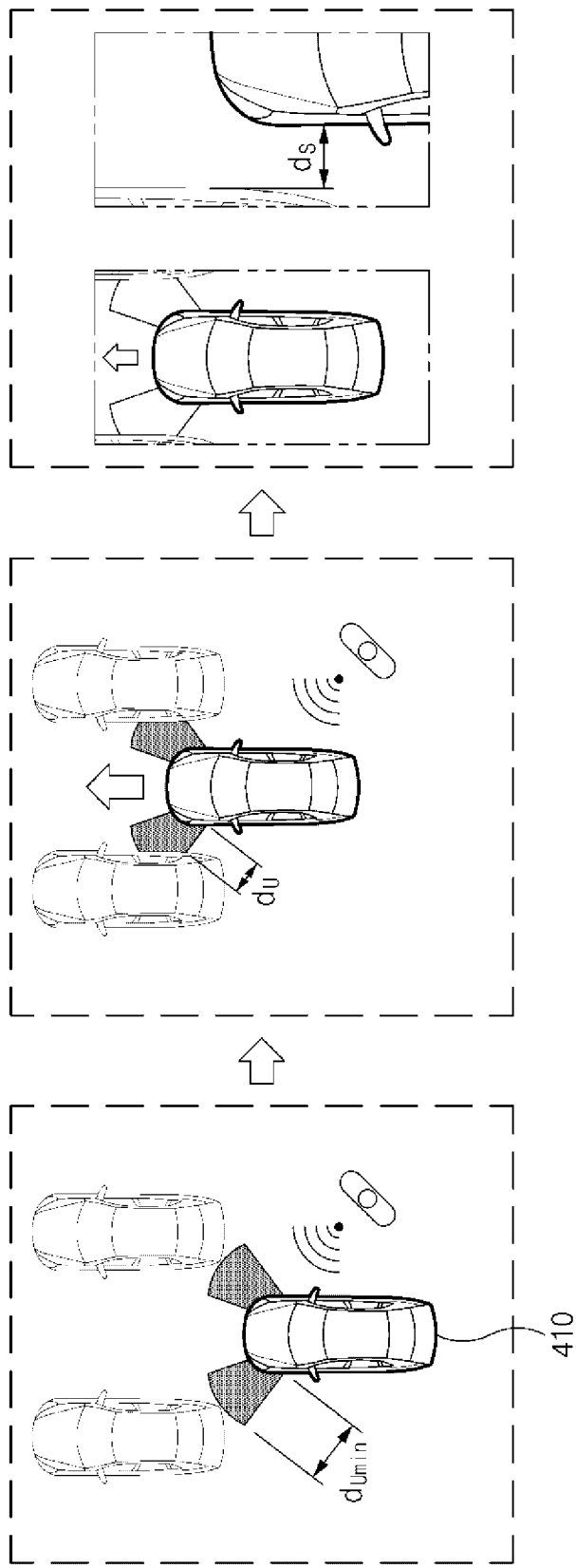
FIG. 4B is a drawing illustrating a second example for a space center mode provided by an apparatus for controlling remote parking in a vehicle according to an exemplary embodiment of the present disclosure.

FIG. 4B is a drawing illustrating a second example for a space center mode provided by an apparatus for controlling remote parking in a vehicle according to an exemplary embodiment of the present disclosure. FIG. 4B illustrates a case where an interval (a parking space) between vehicles which park at left and right sides of the parking slot is narrow. As shown in FIG. 4B, when a host vehicle 410 enters a parking space, since an interval $d_U$ between the host vehicle 410 and an obstruction (e.g., a surrounding vehicle), measured by the ultrasonic sensor 30, becomes less than a minimum sensing distance $d_{Umin}$ of the ultrasonic sensor 30, the host vehicle 410 is unable to park using only the ultrasonic sensor 30. In other words, since the controller 50 is unable to detect a separation distance from the obstruction in the process where the host vehicle 410 enters the parking space, the controller 50 may be configured to stop the host vehicle 410.

Particularly, the controller 50 may be configured to operate the RSPA system 200 based on an SVM image received via an SVM image receiver 40 of FIG. 1. In other words, when an interval ds between the host vehicle 410 and the obstruction, measured using an SVM image, is greater than or equal to a threshold distance, the controller 50 may continue parking the host vehicle 410. The threshold distance may be less than the minimum sensing distance $D_{Umin}$ of the ultrasonic sensor 30.

Figure 4C:
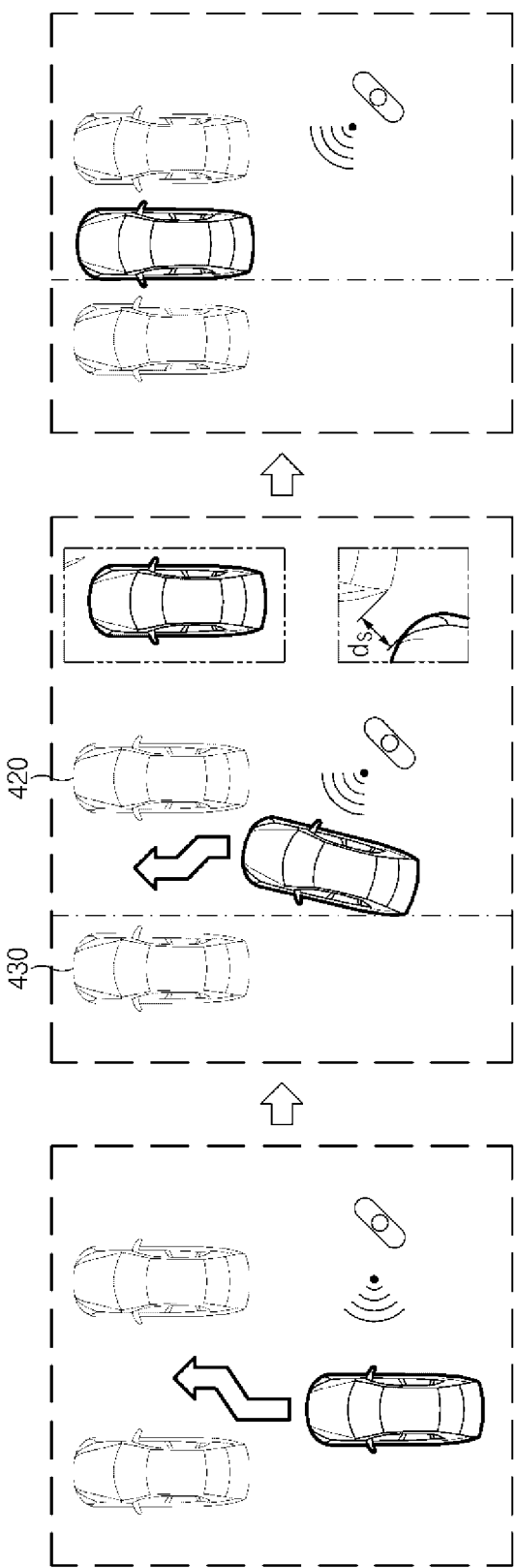
FIG. 4C is a drawing illustrating a third example for a space center mode provided by an apparatus for controlling remote parking in a vehicle according to an exemplary embodiment of the present disclosure.

FIG. 4C is a drawing illustrating a third example for a space center mode provided by an apparatus for controlling remote parking in a vehicle according to an exemplary embodiment of the present disclosure. FIG. 4C illustrates a case where steering control is accompanied since a vehicle is unable to park when driving substantially straight.

As shown in FIG. 4C, the controller 50 may be configured to perform steering control such that the host vehicle 410 enters a parking space. In particular, the controller 50 may be configured to move the host vehicle 410 closer to an obstruction using an SVM image such that the host vehicle 410 enters the parking space and parks within the parking space. When the controller 50 executes parking using only the ultrasonic sensor 30, since the controller 50 is unable to move the host vehicle 410 sufficiently close to an obstruction 420, contact between the rear of the host vehicle 410 and an obstruction 430 may occur in the parking process.

FIG. 5 is a drawing illustrating a line center mode provided by an apparatus for controlling remote parking in a vehicle according to an exemplary embodiment of the present disclosure. As shown in FIG. 5, a controller 50 of FIG. 1 may be configured to operate an RSPA system 200 of FIG. 1 to park a host vehicle 410 in the center of a parking slot irrespective of an interval between obstructions 510 and 520 located at both sides of the parking slot. In particular, since the first obstruction 510 is parked proximate to the left, an interval between the host vehicle 410 and the first obstruction 510 is wider than an interval between the host vehicle 410 and the second obstruction 520.

Figure 6:
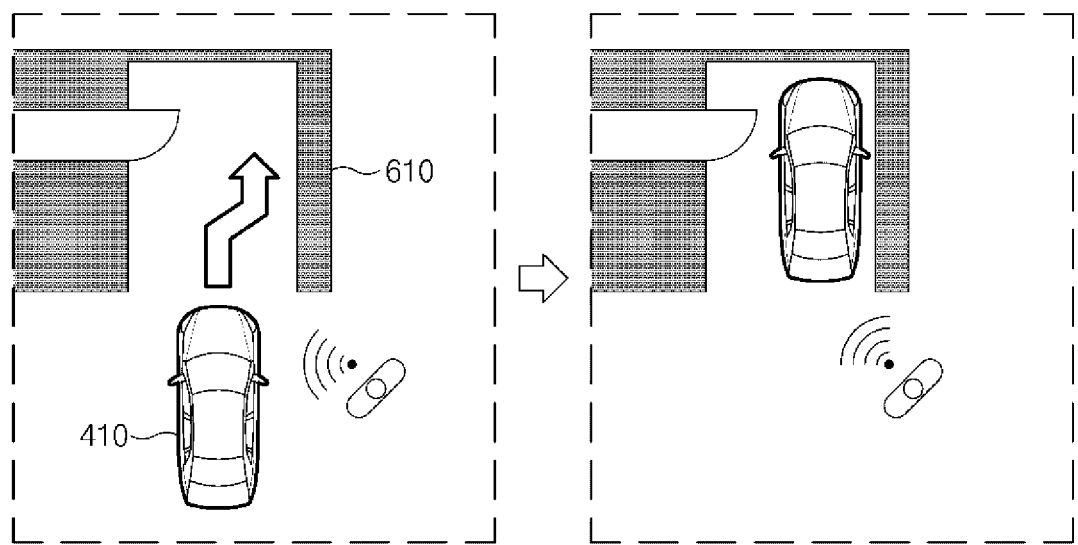
FIG. 6 is a drawing illustrating a right line mode provided by an apparatus for controlling remote parking in a vehicle according to an exemplary embodiment of the present disclosure.

FIG. 6 is a drawing illustrating a right line mode provided by an apparatus for controlling remote parking in a vehicle according to an exemplary embodiment of the present disclosure. As shown in FIG. 6, since a gate is located at a left side of a parking slot, a controller 50 of FIG. 1 may be configured to operate an RSPA system of FIG. 1 to park a host vehicle 410 proximate to a right line 610 of the parking lines.

Figure 7:
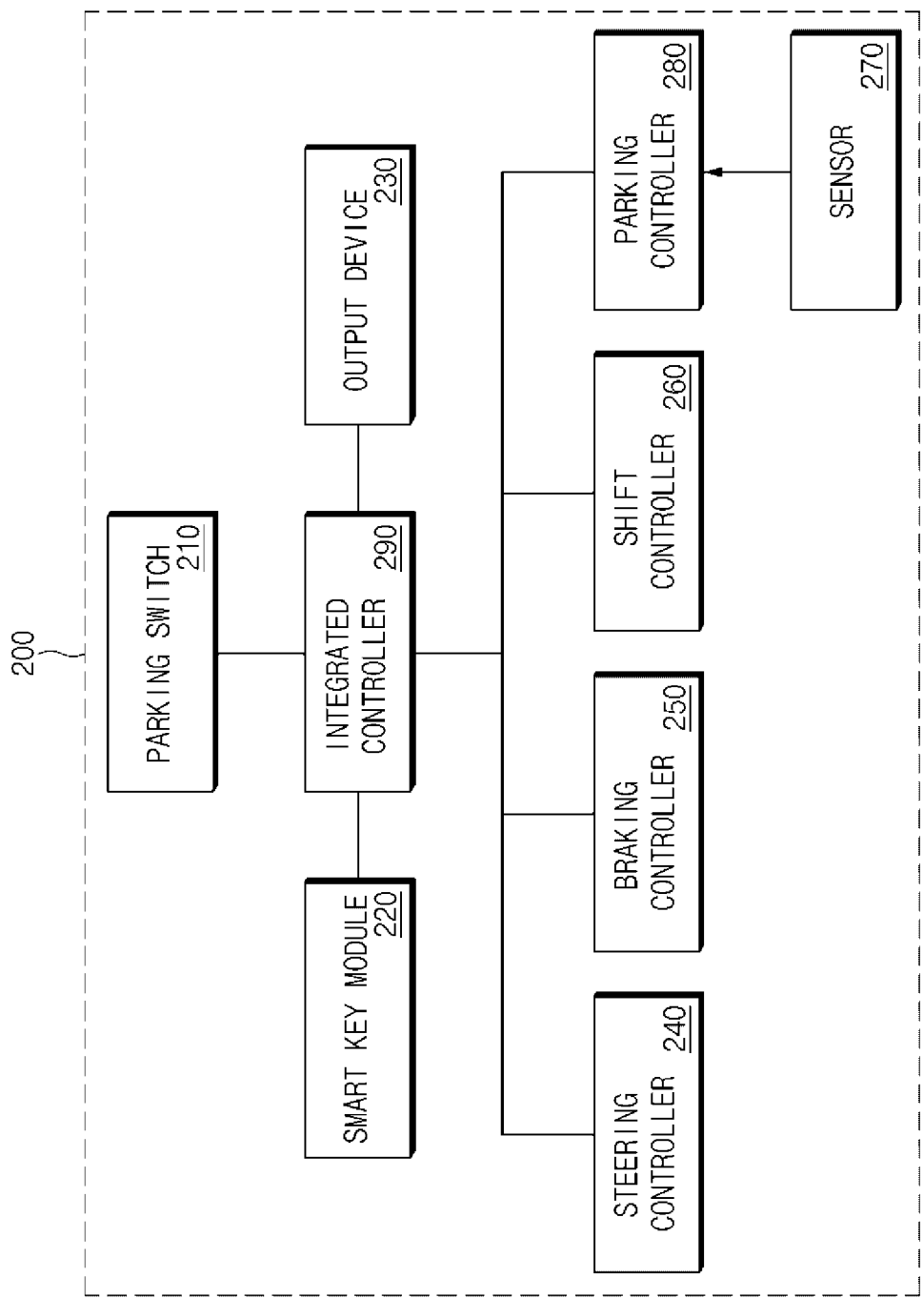
FIG. 7 is a drawing illustrating an example of an RSPA system used in an exemplary embodiment of the present disclosure.

FIG. 7 is a drawing illustrating an example of an RSPA system used in an exemplary embodiment of the present disclosure. As shown in FIG. 7, an RSPA system 200 used in an exemplary embodiment of the present disclosure may include a parking switch 210, a smart key module 220, an output device 230, a steering controller 240, a braking controller 250, a shift controller 260, a sensor 270, a parking controller 280, and an integrated controller 290.

The parking switch 210 may be configured to generate a control command to instruct a vehicle to park and exit based on an operation of a user. The smart key module 220 may be configured to perform low frequency (LF) communication or radio frequency (RF) communication with a smart key. The smart key module 220 may be configured to receive a signal from the smart key and remotely perform vehicle door control, starting control, or the like. When a starting signal of an engine is received from the smart key, the smart key module 220 may be configured to execute user authentication and transmit the starting signal to an engine controller.

Additionally, the output device 230 may be configured to visually and/or audibly output information regarding an operation state of the vehicle, guidance information for each parking step, and the like and may include a cluster, a display, a speaker, or the like. The steering controller 240 may assist in controlling steering of the vehicle and may be implemented as motor drive power steering (MDPS). The braking controller 250 may assist in adjusting a speed of the vehicle and may be implemented as electronic stability control (ESC). The shift controller 260 may assist in shifting a gear (a shift end) of the vehicle and may be implemented as shift by wire (SBW).

The sensor 270 may be configured to sense information regarding an environment outside the vehicle and information regarding a behavior of the vehicle (e.g., a vehicle state such as speed, ignition on/off, and the like). The sensor 270 may include an ultrasonic sensor, a radar, a light detection and ranging (LiDAR), an image sensor, a vehicle speed sensor, a steering angle sensor, or the like. The parking controller 280 may be configured to scan parking spaces using the sensor 270 and select any one of the scanned parking spaces as a target parking space. The parking controller 280 may then be configured to calculate a parking trajectory for parking the vehicle in the target parking space and sequentially generate one or more parking steps (e.g., parking maneuvers) along the parking trajectory. The parking controller 280 may be configured to operate the steering controller 240, the braking controller 250, and the shift controller 260 to sequentially perform the respective parking step.

The integrated controller 290 may be connected with the steering controller 240, the braking controller 250, the shift controller 260, and the parking controller 280 via a vehicle network such as a chassis controller area network (CAN). Herein, the steering controller 240, the braking controller 250, the shift controller 260, and the parking controller 280 may be configured to communicate with each other via the chassis CAN. The integrated controller 290 may be connected with the parking switch 210, the smart key module 220, and the output device 230 via a body CAN and may be configured to receive a control signal, transmitted from a user terminal 400 of FIG. 1, via the smart key module 220.

Additionally, the integrated controller 290 may interwork with a telematics terminal included in the vehicle to communicate with the user terminal 400 and communicate with the user terminal 400 over short-range communication (e.g., Bluetooth, Wi-Fi, infrared communication, or the like). The integrated controller 290 may be an integrated package module for operating an engine of the vehicle, a chassis of the vehicle, and electronics and convenience features. The integrated controller 290 may include an electronic control unit (ECU) for operating a battery, an engine, a transmission, a steering device, a suspension, a brake device, or the like. Furthermore, the integrated controller 290 may include a body control module (BCM) for operating an air conditioning system, a cluster, a digital gauge, a windshield wiper, a light, a rear obstruction detection device, theft prevention, multi-communication, door locking, a power window, a power seat, a seat belt, an airbag, or the like.

The integrated controller 290 may be configured to store a control program in its memory (not shown) and operating a component within the vehicle using the control program. In other words, the integrated controller 290 may be specifically programmed to execute the control program. The integrated controller 290 may be configured to park the vehicle based on a corresponding parking mode under operation of a controller 50 of FIG. 1. The integrated controller 290 may be configured to park the vehicle based on any one of a space center mode, a line center mode, a right line mode, or a left line mode.

When the parking switch 210 is turned on, the integrated controller 290 may enable a remote, full-auto parking function. In particular, the integrated controller 290 may be configured to operate the parking controller 280 to scan a parking space and guide the user to exit the vehicle when the scanning of the parking space is completed. Thereafter, when the user exits the vehicle and inputs a parking mode using a user terminal 400 of FIG. 1, the integrated controller 290 may be configured to identify a location of the user and determine whether the safety of the user is ensured. In particular, the integrated controller 290 may be configured to determine whether the user is located within a safe range or distance (e.g., to avoid any contact during the parking process) via wireless communication between the smart key module 220 and the user terminal 400. When the safety of the user is ensured, the integrated controller 290 may be configured to operate the parking controller 280 to start to park the vehicle.

Figure 8:
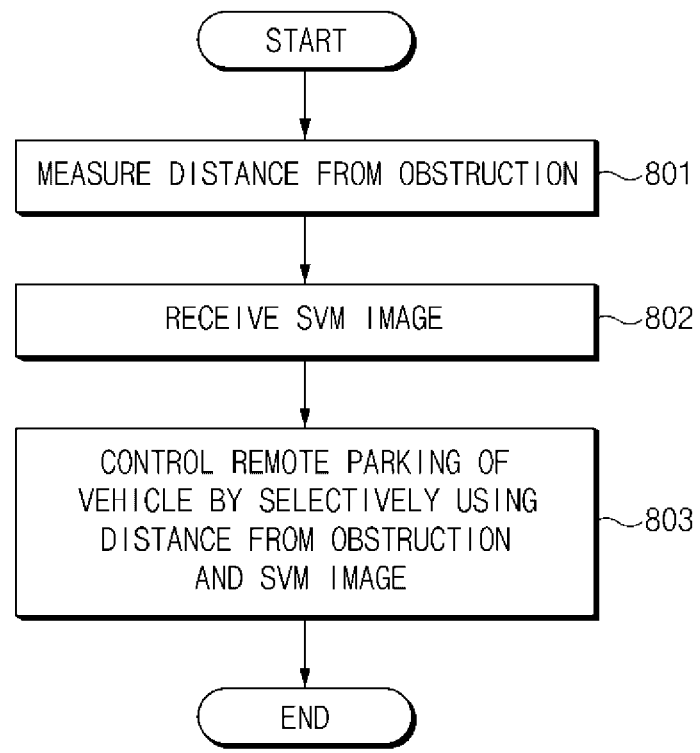
FIG. 8 is a flowchart illustrating a method for controlling remote parking in a vehicle according to an exemplary embodiment of the present disclosure.

FIG. 8 is a flowchart illustrating a method for controlling remote parking in a vehicle according to an exemplary embodiment of the present disclosure. In operation 801, an ultrasonic sensor 30 of FIG. 1 may be configured to measure a distance from an obstruction. In operation 802, an SVM image receiver 40 of FIG. 1 may be configured to receive an SVM image from an SVM system 100 of FIG. 1. In operation 803, a controller 50 of FIG. 1 may be configured to execute remote parking of the vehicle by selectively using the distance from the obstruction, measured by the ultrasonic sensor 30, and the SVM image received from the SVM image receiver 40.

Figure 9:
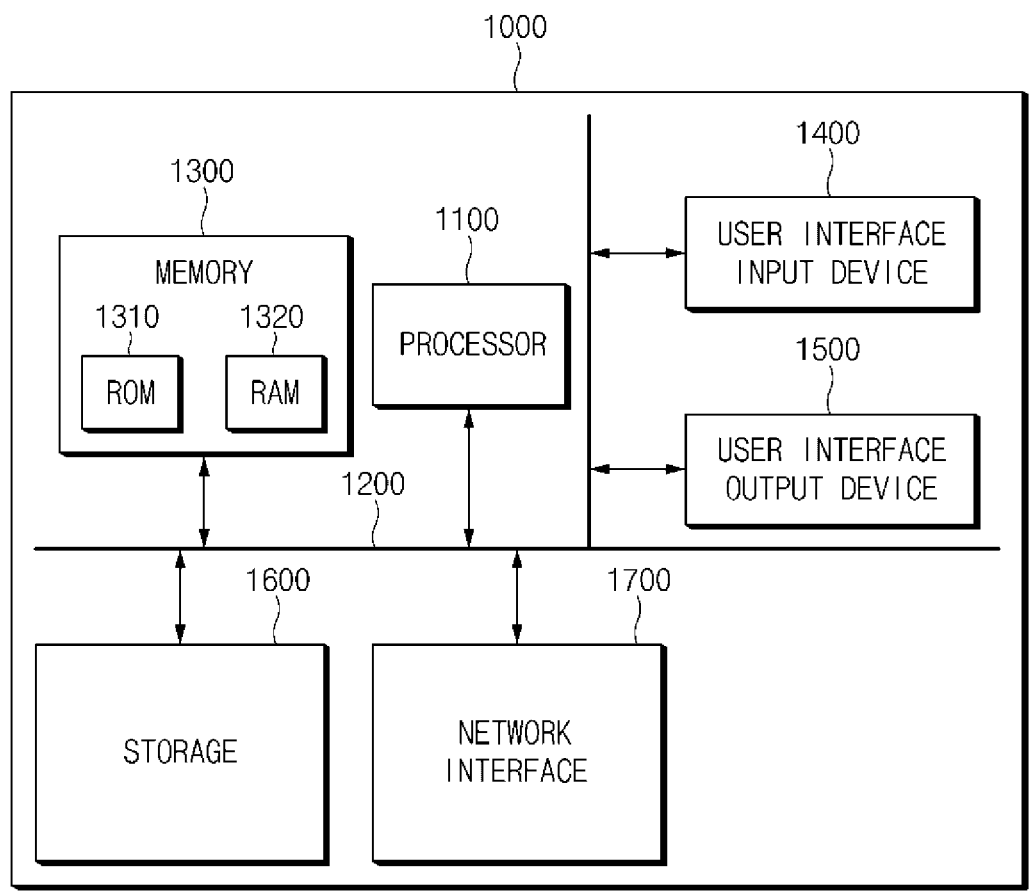
FIG. 9 is a block diagram illustrating a computing system for executing a method for controlling remote parking in a vehicle according to an exemplary embodiment of the present disclosure.

FIG. 9 is a block diagram illustrating a computing system for executing a method for controlling remote parking in a vehicle according to an exemplary embodiment of the present disclosure. Referring to FIG. 9, the method for controlling the remote parking in the vehicle according to an exemplary embodiment of the present disclosure may be implemented by the computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus and method for controlling the remote parking in the vehicle according to an exemplary embodiment of the present disclosure may park the vehicle in a narrow parking space based on an ultrasonic sensor and a surrounding view monitoring (SVM) image and may provide various parking modes.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling remote parking in a vehicle, comprising:
   an ultrasonic sensor provided in the vehicle and configured to measure a distance from the vehicle to an obstruction;
   a receiver configured to receive a surround view monitoring (SVM) image from an SVM system provided in the vehicle; and
   a controller configured to execute remote parking of the vehicle by selectively using the distance to the obstruction and the SVM image,
   wherein the controller is configured to:
   select the ultrasonic sensor when a separation distance from other vehicles which are parked at both sides of a parking space is more than a minimum sensing distance; and
   select the SVM image when the separation distance from other vehicles which are parked at both sides of the parking space is less than the minimum sensing distance.

2. The apparatus of claim 1, further comprising:
   a communicator configured to transmit the distance to the obstruction and the SVM image to a user terminal.

3. The apparatus of claim 2, wherein the controller is configured to execute the remote parking of the vehicle based on a parking mode transmitted from the user terminal.

4. The apparatus of claim 3, wherein the parking mode includes a space center mode, a line center mode, a right line mode, and a left line mode.

5. The apparatus of claim 4, wherein the controller is configured to execute the remote parking of the vehicle based on the distance to the obstruction, the distance being measured by the ultrasonic sensor, when a width of a parking space is greater than a threshold in the space center mode.

6. The apparatus of claim 4, wherein the controller is configured to execute the remote parking of the vehicle based on the SVM image, when a width of a parking space is less than or equal to a threshold in the space center mode.

7. The apparatus of claim 4, wherein the controller is configured to execute the remote parking of the vehicle based on a distance to the obstruction, the distance being measured using the SVM image, when the distance to the obstruction, the distance being measured by the ultrasonic sensor, is less than a minimum sensing distance in the space center mode.

8. The apparatus of claim 4, wherein the controller is configured to execute the remote parking of the vehicle based on a distance to the obstruction, the distance being measured using the SVM image in the line center mode.

9. The apparatus of claim 4, wherein the controller is configured to execute the remote parking of the vehicle based on a distance from a right line of a parking slot, the distance being measured using the SVM image in the right line mode.

10. The apparatus of claim 4, wherein the controller is configured to execute the remote parking of the vehicle based on a distance from a left line of a parking slot, the distance being measured using the SVM image in the left line mode.

11. The apparatus of claim 1, wherein the controller is configured to:
    generate virtual parking lines when parking lines are not detected; and
    execute remote parking of the vehicle based on the virtual parking lines.

12. A method for controlling remote parking in a vehicle, comprising:
    measuring, by an ultrasonic sensor of the vehicle, a distance from the vehicle to an obstruction;
    receiving, by a receiver of the vehicle, a surround view monitoring (SVM) image from an SVM system provided in the vehicle; and
    executing, by a controller of the vehicle, remote parking of the vehicle by selectively using the measured distance to the obstruction and the received SVM image
    wherein the controller is further configured to:
    select the ultrasonic sensor when a separation distance from other vehicles which are parked at both sides of a parking space is more than a minimum sensing distance; and
    select the SVM image when the separation distance from other vehicles which are parked at both sides of the parking space is less than the minimum sensing distance.

13. The method of claim 12, further comprising:
    transmitting, by a communicator of the vehicle, the distance to the obstruction and the SVM image to a user terminal.

14. The method of claim 13, wherein the executing of the remote parking of the vehicle includes:
    executing the remote parking of the vehicle based on a parking mode transmitted from the user terminal.

15. The method of claim 14, wherein the parking mode includes a space center mode, a line center mode, a right line mode, and a left line mode.

16. The method of claim 15, wherein the executing of the remote parking of the vehicle includes:
   executing the remote parking of the vehicle based on the distance to the obstruction, the distance being measured by the ultrasonic sensor, when a width of a parking space is greater than a threshold in the space center mode.

17. The method of claim 15, wherein the executing of the remote parking of the vehicle includes:
   executing the remote parking of the vehicle based on the SVM image, when a width of a parking space is less than or equal to a threshold in the space center mode.

18. The method of claim 15, wherein the executing of the remote parking of the vehicle includes:
   executing the remote parking of the vehicle based on a distance to the obstruction, the distance being measured using the SVM image, when the distance to the obstruction, the distance being measured by the ultrasonic sensor, is less than a minimum sensing distance in the space center mode.

19. The method of claim 15, wherein the executing of the remote parking of the vehicle includes:
   executing the remote parking of the vehicle based on a distance to the obstruction, the distance being measured using the SVM image in the line center mode.

20. The method of claim 15, wherein the executing of the remote parking of the vehicle includes:
   executing the remote parking of the vehicle based on a distance from a right line of a parking slot, the distance being measured using the SVM image in the right line mode.

21. The method of claim 15, wherein the executing of the remote parking of the vehicle includes:
   executing the remote parking of the vehicle based on a distance from a left line of a parking slot, the distance being measured using the SVM image in the left line mode.

22. The method of claim 12, wherein the executing of the remote parking of the vehicle includes:
   generating, by the controller, virtual parking lines when parking lines are not detecting; and
   executing, by the controller, remote parking of the vehicle based on the virtual parking lines.

* * * * *